US011852226B2

(12) United States Patent
Ikeda (10) Patent No.: US 11,852,226 B2
(45) Date of Patent: Dec. 26, 2023

(54) OIL PASSAGE STRUCTURE

(71) Applicants:JATCO Ltd, Fuji (JP); NISSAN MOTOR CO., LTD., Yokohama (JP)

(72) Inventor: Tomoo Ikeda, Yamato (JP)

(73) Assignees: JATCO LTD, Fuji (JP); NISSAN MOTOR CO., LTD., Fuji (JP)

( * ) Notice: Subject to any disclaimer, the term of this patent is extended or adjusted under 35 U.S.C. 154(b) by 0 days.

(21) Appl. No.: 17/785,014

(22) PCT Filed: Dec. 2, 2020

(86) PCT No.: PCT/JP2020/044848
§ 371 (c)(1),
(2) Date: Jun. 13, 2022

(87) PCT Pub. No.: WO2021/117573
PCT Pub. Date: Jun. 17, 2021

(65) Prior Publication Data
US 2023/0009118 A1    Jan. 12, 2023

(30) Foreign Application Priority Data
Dec. 14, 2019 (JP) .................................. 2019-226017

(51) Int. Cl.
*F16H 41/30* (2006.01)
*F16H 41/28* (2006.01)

(52) U.S. Cl.
CPC ............. *F16H 41/30* (2013.01); *F16H 41/28* (2013.01)

(58) Field of Classification Search
CPC ........................ F16H 41/30; F16H 2045/0215
See application file for complete search history.

(56) References Cited

U.S. PATENT DOCUMENTS

| 6,863,635 | B2 * | 3/2005 | Tsuga ...................... F16H 3/663 |
| | | | 475/275 |
| 8,567,579 | B2 * | 10/2013 | Nakamura .............. F16H 41/30 |
| | | | 192/3.3 |
| 9,003,926 | B2 * | 4/2015 | Mizuno ................... F16H 41/30 |
| | | | 74/731.1 |
| 9,885,404 | B2 * | 2/2018 | Takahashi ............... F16H 47/02 |
| 2007/0125615 | A1 | 6/2007 | Okada et al. |

FOREIGN PATENT DOCUMENTS

| JP | 02-217658 A | 8/1990 |
| JP | H07-217724 A | 8/1995 |
| JP | 2007-139068 A | 6/2007 |
| JP | 2014-020299 A | 2/2014 |
| JP | 2018-123857 A | 8/2018 |

* cited by examiner

*Primary Examiner* — Michael Leslie
(74) *Attorney, Agent, or Firm* — Foley & Lardner LLP (57) ABSTRACT

An oil passage structure, includes a first tubular member configured to externally fit on a support wall portion and a second tubular member configured to internally fit in the support wall portion and supports an outer periphery of the shaft. An oil passage along a rotation axis direction of the shaft is provided at at least one of a location between the support wall portion and the first tubular member and a location between the support wall portion and the second tubular member.

4 Claims, 9 Drawing Sheets

OIL PASSAGE STRUCTURE

TECHNICAL FIELD

The present invention relates to an oil passage structure.

BACKGROUND ART

JP2014-020299A discloses an oil pump cover inside which an oil passage is formed.

In an automatic transmission for a vehicle, a dummy cover (cover member) that separates the internal space of a transmission case from the internal space of a converter housing is provided between the transmission case that houses a transmission mechanism unit and the converter housing that houses a torque converter.

An oil passage is formed inside the cover member like inside the oil pump cover, and oil supplied from a hydraulic control circuit is supplied to the transmission mechanism unit side through the oil passage in the cover member and used for driving or lubricating the transmission mechanism unit.

The central portion of the cover member is provided with a through hole through which an output shaft of the torque converter penetrates and a cylindrical support wall portion surrounding the through hole.

The output shaft is a shaft involved in torque transfer from the torque converter to the transmission mechanism unit, and the support wall portion is formed with a thickness in the radial direction in order to ensure the support rigidity of the shaft.

SUMMARY OF INVENTION

Here, it is conceivable to reduce the outer diameter of the support wall portion for the purpose of reducing the weight of the cover member.

However, if an oil passage along the rotation axis of the shaft is provided in the support wall portion, simply reducing the outer diameter of the support wall portion may reduce the support rigidity of the shaft at the support wall portion.

Therefore, it is required to reduce the weight while ensuring the support rigidity of the shaft.

According to an aspect of the present invention, an oil passage structure, includes:
- a support wall portion surrounding an insertion hole of a shaft;
- a first tubular member configured to externally fit on the support wall portion; and
- a second tubular member configured to internally fit in the support wall portion and supports an outer periphery of the shaft.

An oil passage along a rotation axis direction of the shaft is provided at at least one of a location between the support wall portion and the first tubular member and a location between the support wall portion and the second tubular member.

According to the above aspect, the weight can be reduced while ensuring the support rigidity of the shaft.

DESCRIPTION OF EMBODIMENTS

In the following, an embodiment of the present invention will be explained.

Figure 1:
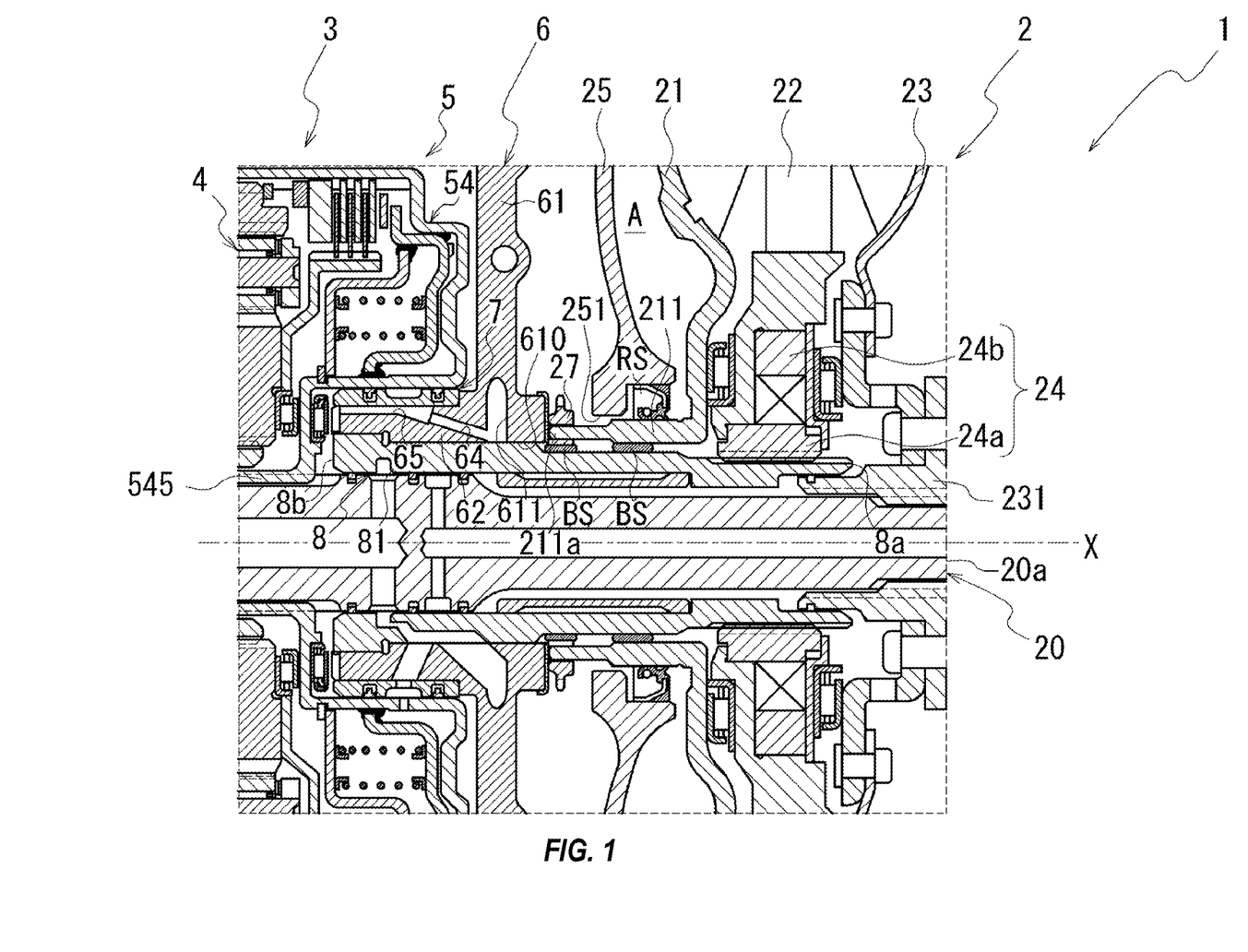
FIG. 1 is a diagram illustrating an automatic transmission that employs an oil passage structure.

FIG. 1 is an enlarged view of the main portion of an automatic transmission 1 that employs an oil passage structure 10.

Figure 2:
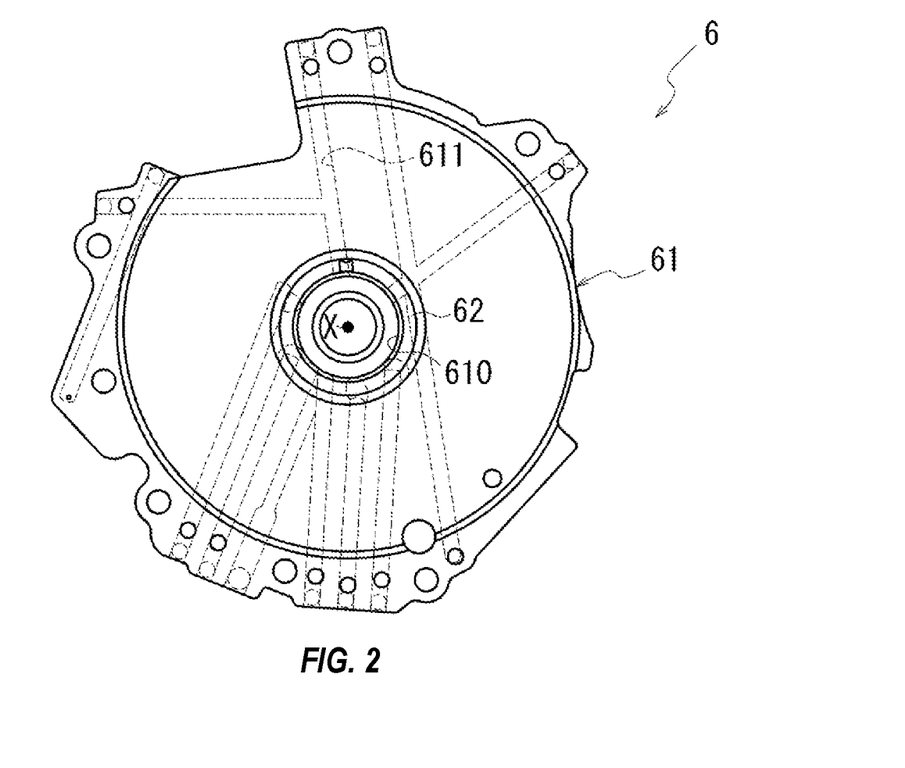
FIG. 2 is a plan view of a cover member.

FIG. 2 is a plan view of a cover member 6 as seen from a forward/reverse travel switching mechanism 3.

Figure 3:
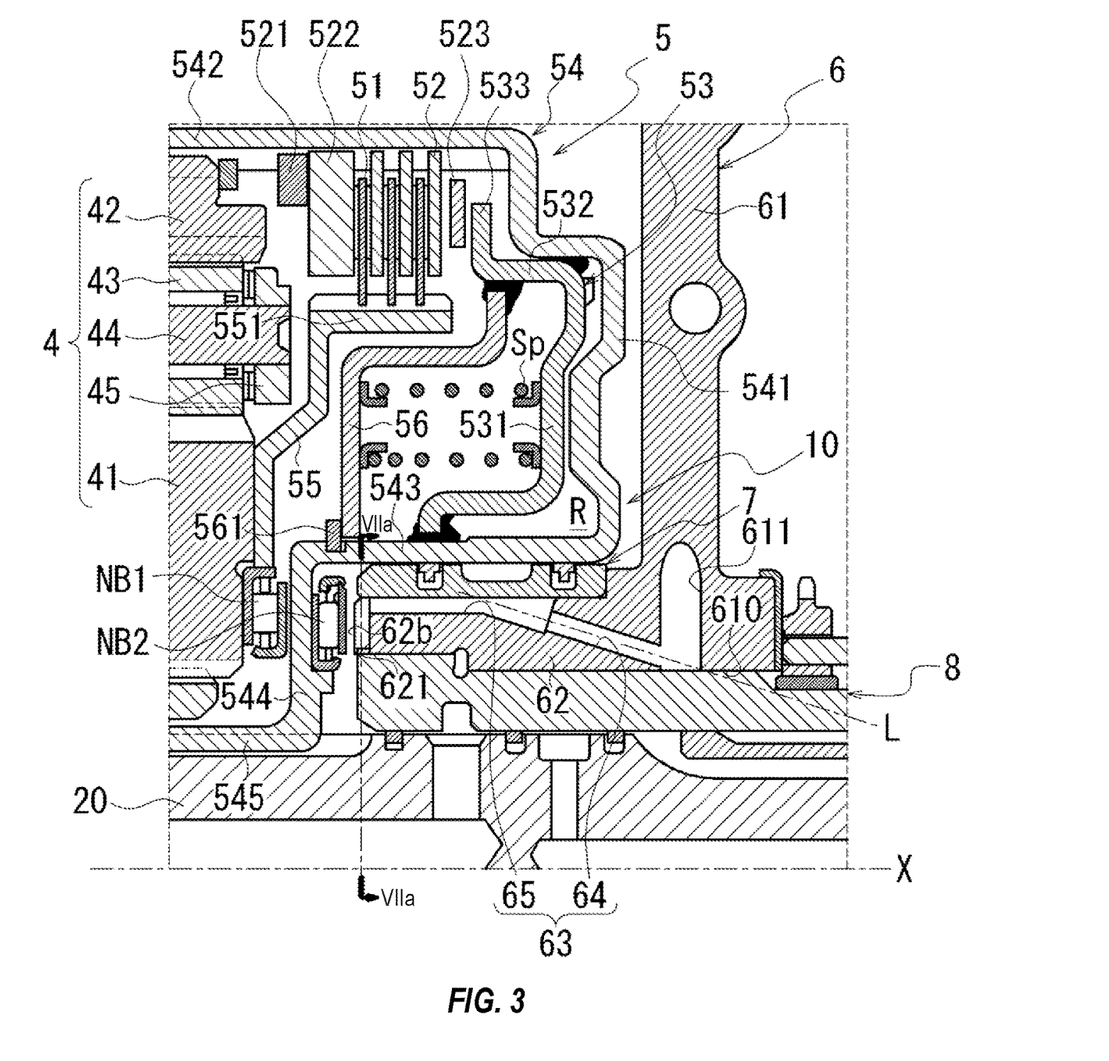
FIG. 3 is an enlarged view of the main portion of the automatic transmission.

FIG. 3 is an enlarged view of the main portion of the automatic transmission 1 and is an enlarged view of the area around a support wall portion 62 of the cover member 6.

As shown in FIG. 1, in the automatic transmission 1 for a vehicle, the cover member 6 (dummy cover) is provided between the torque converter 2 and the forward/reverse travel switching mechanism 3 which is a component of a transmission mechanism unit.

The cover member 6 has a partition wall portion 61 that is plate-shaped in cross-sectional view. The partition wall portion 61 is provided in a direction orthogonal to a rotation axis X.

The partition wall portion 61 of the cover member 6 is bolted to an unillustrated transmission case to seal an opening facing the torque converter 2 on the transmission case.

A plurality of oil passages are provided inside the partition wall portion 61 (see FIG. 2, the virtual lines). Oil is supplied to each of the oil passages from an unillustrated hydraulic control circuit. The oil supplied to the oil passages is supplied to the transmission mechanism unit and the torque converter 2. The oil supplied to the transmission mechanism unit is used to drive and lubricate the transmission mechanism unit.

As shown in FIG. 1, an insertion hole 610 is provided in the central portion of the partition wall portion 61. The insertion hole 610 penetrates the partition wall portion 61 in the thickness direction (the direction of the rotation axis X).

A cylindrical support wall portion 62 surrounding the insertion hole 610 is provided on the side of the forward/reverse travel switching mechanism 3 (the left side in FIG. 1) in the partition wall portion 61.

In the automatic transmission 1, the output shaft 20 of the torque converter 2 is inserted through the insertion hole 610 of the cover member 6 from the side of the torque converter 2 to the side of the transmission mechanism unit (the left side in the figure).

The output shaft 20 is a transfer shaft involved in the torque transfer from the torque converter 2 to the transmission mechanism unit. The output shaft 20 is provided along the rotation axis X.

A turbine hub 231 is spline-fitted to an end 20a of the output shaft 20. A turbine runner 23 of the torque converter 2 is fixed to the turbine hub 231. The turbine runner 23 is integrally rotatably connected to the output shaft 20 via the turbine hub 231.

In the torque converter 2, a pump impeller 21 and the turbine runner 23 are provided in a manner that they can rotate relative to each other around the common rotation axis X. A stator 22 is located between the pump impeller 21 and the turbine runner 23. The stator 22 is supported by a stator shaft 8 via an one-way clutch 24.

The stator shaft 8 is provided in a direction along the rotation axis X. The stator shaft 8 is externally inserted to the output shaft 20 of the torque converter 2, and an inner race 24a of the one-way clutch 24 is spline-fitted to the outer periphery on the side of a tip end 8a of the stator shaft 8.

The stator shaft 8 penetrates the insertion hole 610 of the cover member 6 from the side of the transmission mechanism unit to the side of the torque converter 2 (the right side in the figure). A fitting portion 81 on the side of a base end 8b of the stator shaft 8 is press-fitted into the inner periphery of the support wall portion 62 of the cover member 6, and the stator shaft 8 is supported by the cover member 6 which is a fixed member.

The side of the tip end 8a of the stator shaft 8 penetrates an opening portion 251 provided in a housing 25 of the torque converter 2 and is located inside the housing 25.

A sleeve 211 formed integrally with the pump impeller 21 is externally inserted to the stator shaft 8.

The sleeve 211 is a tubular member provided in the direction along the rotation axis X, and the inner periphery of the sleeve 211 is supported by the outer periphery of the stator shaft 8 via a bush BS.

The sleeve 211 is provided across the opening portion 251 of the housing 25 toward the transmission mechanism unit. A tip end 211a of the sleeve 211 faces the partition wall portion 61 of the cover member 6.

The outer periphery of the sleeve 211 is elastically in contact with a lip seal RS provided in the opening portion 251 of the housing 25, and the lip seal RS seals the internal space A of the housing 25 oil-tightly.

The tip end 211a of the sleeve 211 is press-fitted into an inner periphery of a drive sprocket 27, and the sleeve 211 and the drive sprocket 27 are connected in a manner that they cannot rotate relative to each other.

The inner periphery of the drive sprocket 27 is supported by the outer periphery of the stator shaft 8 via the bush BS.

Here, in the torque converter 2, the output rotation of the unillustrated driving source is input to the pump impeller 21, and the pump impeller 21 rotates around the rotation axis X.

Thus, the sleeve 211 formed integrally with the pump impeller 21 and the drive sprocket 27 fixed to the sleeve 211 also rotate around the rotation axis X.

An unillustrated chain is wound around the drive sprocket 27, and the rotation of the sleeve 211 is transferred to an oil pump (not illustrated) via the chain to drive the oil pump. Thereby, the original pressure is supplied to the unillustrated hydraulic control circuit.

At this time, in the stator shaft 8 where the drive sprocket 27 is supported by the outer periphery via the bush BS, stress acts on the region on the opposite side of the oil pump (the upper region in FIG. 1) from the chain wound around the drive sprocket 27 toward the rotation axis X. Thus, the stress input to the stator shaft 8 acts on the cover member 6 (support wall portion 62) where the stator shaft 8 is supported.

In addition, the rotation of the pump impeller 21 is transferred to the turbine runner 23 via the fluid in the housing 25. Thus, the rotation of the turbine runner 23 is transferred to the output shaft 20 via the turbine hub 231 and the output shaft 20 rotates around the rotation axis X.

The output shaft 20 penetrates the support wall portion 62 provided in the cover member 6 in the direction of the rotation axis X and extends to the inner diameter side of the forward/reverse travel switching mechanism 3.

A connecting portion 545 of a clutch drum 54 is spline-fitted onto the outer periphery of the region protruding from the support wall portion 62 at the output shaft 20.

The output shaft 20 is relatively non-rotatably connected to the clutch drum 54 on the side of the forward/reverse travel switching mechanism 3.

Therefore, in the automatic transmission 1, the output rotation of the torque converter 2 is input to the clutch drum 54 of the forward/reverse travel switching mechanism 3 via the output shaft 20.

The forward/reverse travel switching mechanism 3 has a planetary gear mechanism 4, a forward clutch 5, and a reverse brake (not illustrated).

As shown in FIG. 3, the planetary gear mechanism 4 has a sun gear 41, a ring gear 42, pinion gears 43, pinion shafts 44, and a carrier 45.

The planetary gear mechanism 4 is housed inside the clutch drum 54 (outer wall portion 542) of the forward clutch 5.

The forward clutch 5 has inner diameter side plates 51, outer diameter side plates 52, and a piston 53 that strokes in the direction of the rotation axis X.

The inner diameter side plates 51 are spline-fitted onto an outer periphery of a cylindrical wall portion 551 of a clutch hub 55. The inner diameter side of the clutch hub 55 is fixed to the side surface of the sun gear 41, and the clutch hub 55 rotates around the rotation axis X integrally with the sun gear 41.

The outer diameter side plates 52 are spline-fitted into the inner periphery of the outer wall portion 542 of the clutch drum 54. The inner diameter side plates 51 and the outer diameter side plates 52 are arranged alternately in the direction of the rotation axis X.

The clutch drum 54 has a bottom wall portion 541 provided in a direction orthogonal to the rotation axis X. When viewed from the direction of the rotation axis X, the bottom wall portion 541 is ring-shaped, and the outer periphery and inner periphery of the bottom wall portion 541 are surrounded through the whole periphery by the cylindrical outer wall portion 542 and inner wall portion 543, respectively.

The inner wall portion 543 is externally inserted to a tubular member 7 (a first annular member). The tubular member 7 is press-fitted onto the outer periphery of the support wall portion 62. The inner wall portion 543 is rotatably supported by the support wall portion 62 of the cover member 6 via the tubular member 7.

At the tip end of the inner wall portion 543, a circular plate portion 544 extending toward the inner diameter side is provided. The circular plate portion 544 is arranged in the gap between the sun gear 41 and the support wall portion 62.

Between the circular plate portion 544 and the sun gear 41, a thrust needle bearing NB1 positioned on the side surface of the sun gear 41 is located.

Between the circular plate portion 544 and the support wall portion 62, a thrust needle bearing NB2 positioned by the circular plate portion 544 is located.

The inner periphery of the circular plate portion 544 extends to the inner diameter side of the stator shaft 8. The cylindrical connecting portion 545 is provided at the end portion of the circular plate portion 544 on the inner diameter side.

The connecting portion 545 is provided in the direction along the rotation axis X, and the connecting portion 545 is spline-fitted onto the outer periphery of the output shaft 20 of the torque converter 2.

In the clutch drum 54, the piston 53 is provided between the inner wall portion 543 and the outer wall portion 542.

The piston 53 has a base portion 531 forming a ring shape when viewed from the direction of the rotation axis X, and a surrounding wall portion 532 surrounding the outer periphery of the base portion 531.

The tip end side of the surrounding wall portion 532 is bent toward the outer diameter side, forming a pushing portion 533 which is ring-shaped when viewed from the direction of the rotation axis X.

In the direction of the rotation axis X, the pushing portion 533 faces the region where the inner diameter side plates 51 and the outer diameter side plates 52 overlap. A disc spring 523 is located between the pushing portion 533 and the outer diameter side plate 52.

The piston 53 is inserted between the inner wall portion 543 and the outer wall portion 542 of the clutch drum 54 from the side of the planetary gear mechanism 4 (the left side in the figure). An oil chamber R to which the operating hydraulic pressure (oil OL) of the piston 53 is supplied is formed between the base portion 531 of the piston 53 and the bottom wall portion 541 of the clutch drum 54.

An end of a spring Sp is in contact with the base portion 531 of the piston 53 from the direction of the rotation axis X. The other end of the spring Sp is supported by a spring retainer 56. The displacement of the spring retainer 56 in the direction away from the piston 53 (the left direction in the figure) is regulated by a snap ring 561 engaged with the outer periphery of the inner wall portion 543.

The piston 53 is energized in a direction away from the planetary gear mechanism 4 by the spring Sp.

When the operating hydraulic pressure is supplied to the oil chamber R, the piston 53 is displaced in a direction approaching the planetary gear mechanism 4 (the left direction in the figure) while compressing the spring Sp in the direction of the rotation axis X. Thereby, the inner diameter side plates 51 and the outer diameter side plates 52 are fastened to each other relatively non-rotatably between a retaining plate 522 positioned by the snap ring 521 and a pushing portion 353 of the piston 53.

Further, when the supply of the operating hydraulic pressure (oil OL) to the oil chamber R is stopped, the piston 53 is displaced by the energizing force of the spring Sp in the direction away from the planetary gear mechanism 4 (the right direction in the figure), and the relative rotation between the inner diameter side plates 51 and the outer diameter side plates 52 is allowed.

Figure 4:
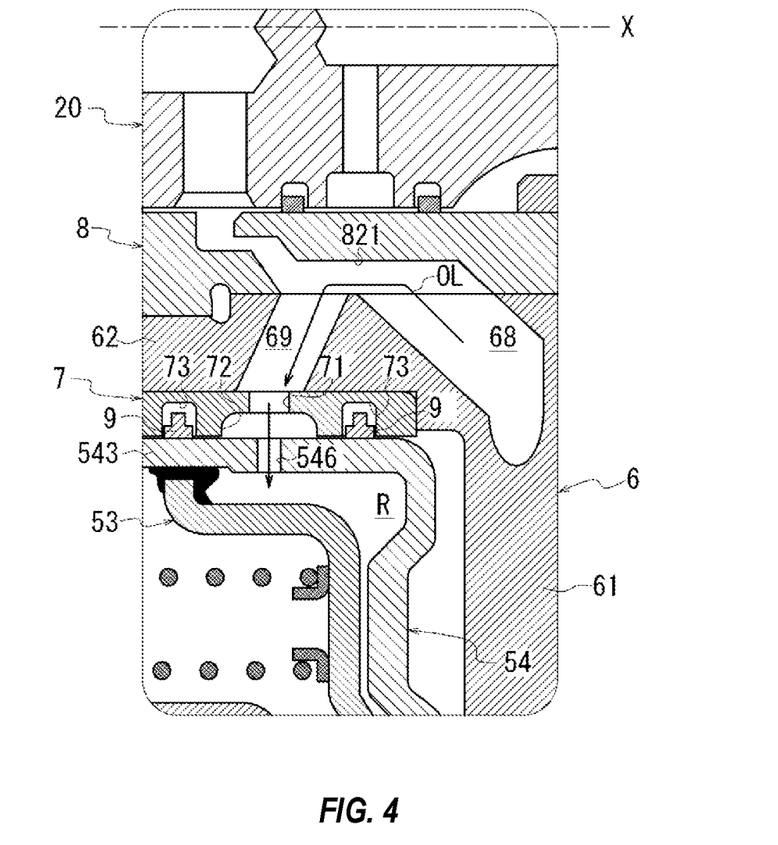
FIG. 4 is a diagram illustrating an oil supply passage to an oil chamber.

FIG. 4 is a diagram illustrating the supply passage of the oil OL to the oil chamber R.

FIGS. 5A-5F are diagrams describing a seal ring 9 and explaining the actions of the seal ring 9.

Figure 5A:
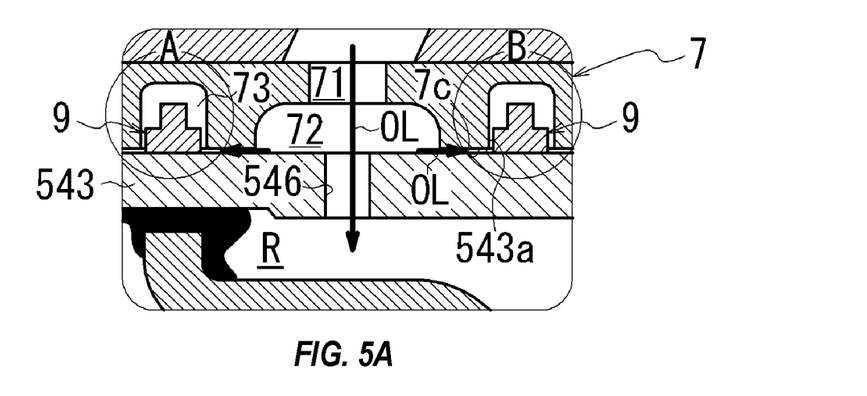
FIG. 5A is a diagram showing the state before the gap between the inner periphery of the inner wall portion of a clutch drum and the outer periphery of a tubular member is sealed by a seal ring.

FIG. 5A is a diagram showing the state before the gap between an inner periphery 543a of the inner wall portion 543 of the clutch drum 54 and an outer periphery 7c of the tubular member 7 is sealed by the seal ring 9.

Figure 5B:
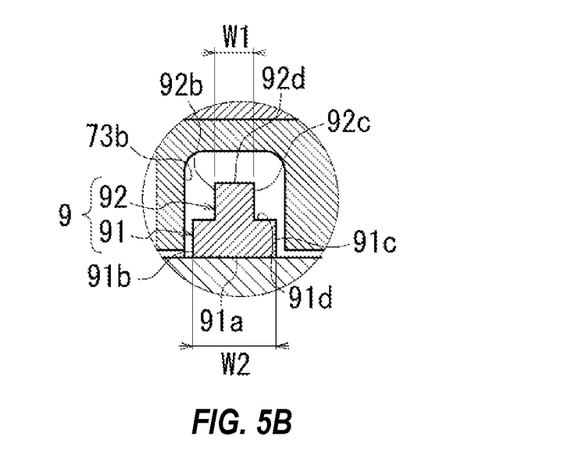
FIG. 5B is an enlarged view of region A in FIG. 5A.

FIG. 5B is an enlarged view of region A in FIG. 5A.

Figure 5C:
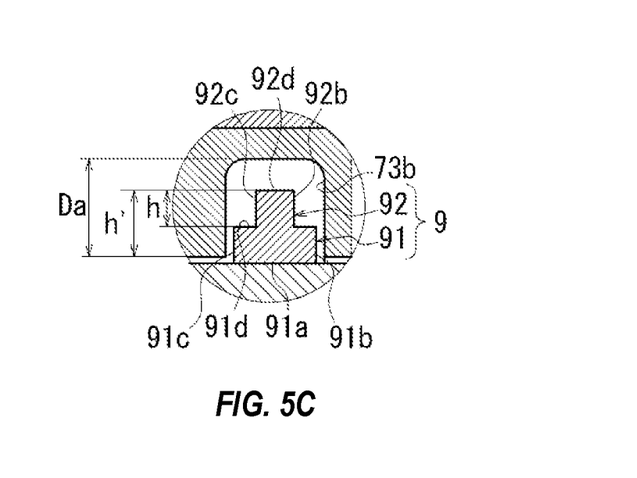
FIG. 5C is an enlarged view of region B in FIG. 5A.

FIG. 5C is an enlarged view of region B in FIG. 5A.

Figure 5D:
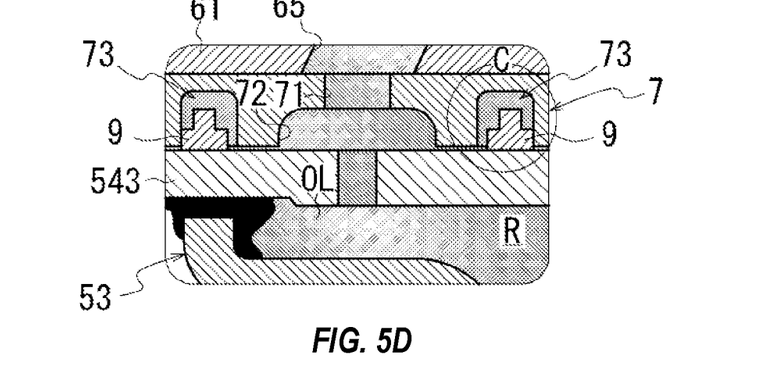
FIG. 5D is a diagram showing the state in which the gap between the inner periphery of the inner wall portion of the clutch drum and the outer periphery of the tubular member is sealed by the seal ring.

FIG. 5D is a diagram showing the state after the gap between the inner periphery 543a of the inner wall portion 543 of the clutch drum 54 and the outer periphery 7c of the tubular member 7 is sealed by the seal ring 9.

Figure 5E:
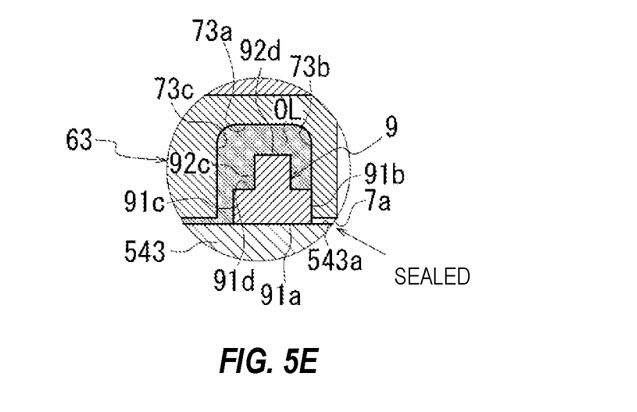
FIG. 5E is an enlarged view of region C in FIG. 5D.

FIG. 5E is an enlarged view of region C in FIG. 5D.

Figure 5F:
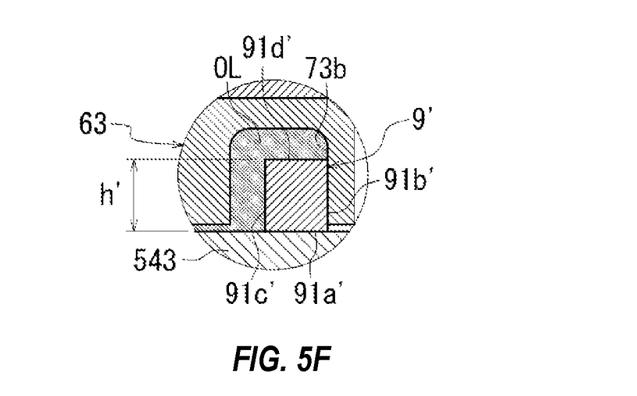
FIG. 5F is a diagram illustrating a seal ring according to a comparative example.

FIG. 5F is a diagram illustrating a seal ring 9' according to a comparative example.

As shown in FIG. 4, the cover member 6 is provided with supply passages 68 and 69 of the oil OL. The supply passage 68 connects to the unillustrated hydraulic control circuit and opens on the inner periphery of the support wall portion 62. In the support wall portion 62, the supply passage 69 is provided adjacent to the supply passage 68. The supply passage 69 communicates the inner periphery and the outer periphery of the support wall portion 62.

The supply passage 69 connects to the supply passage 68 via an oil groove 821 provided on the outer periphery of the stator shaft 8. The oil OL supplied to the supply passage 68 from the unillustrated hydraulic control circuit is supplied to the supply passage 69 via the oil groove 821.

The supply passage 69 opens on the outer periphery of the support wall portion 62 in the region where the tubular member 7 is press-fitted. In the tubular member 7, an oil hole 71 opens on the inner periphery of the region facing the supply passage 69.

The oil hole 71 communicates with an oil groove 72 that opens on the outer periphery of the tubular member 7. The oil hole 71 opens approximately in the center of the oil groove 72 in the direction of the rotation axis X.

In the inner wall portion 543 of the clutch drum 54, an oil hole 546 is formed in the region facing the oil hole 71 and the oil groove 72. The oil hole 546 communicates with the oil chamber R described above.

The oil chamber R connects to the supply passage 69 via the oil hole 546 of the inner wall portion 543 and the oil groove 72 and oil hole 71 of the tubular member 7.

In the tubular member 7 press-fitted onto the outer periphery of the support wall portion 62, ring grooves 73 and 73 are provided on both sides of the oil hole 71 in the direction of the rotation axis X.

Figure 7A:
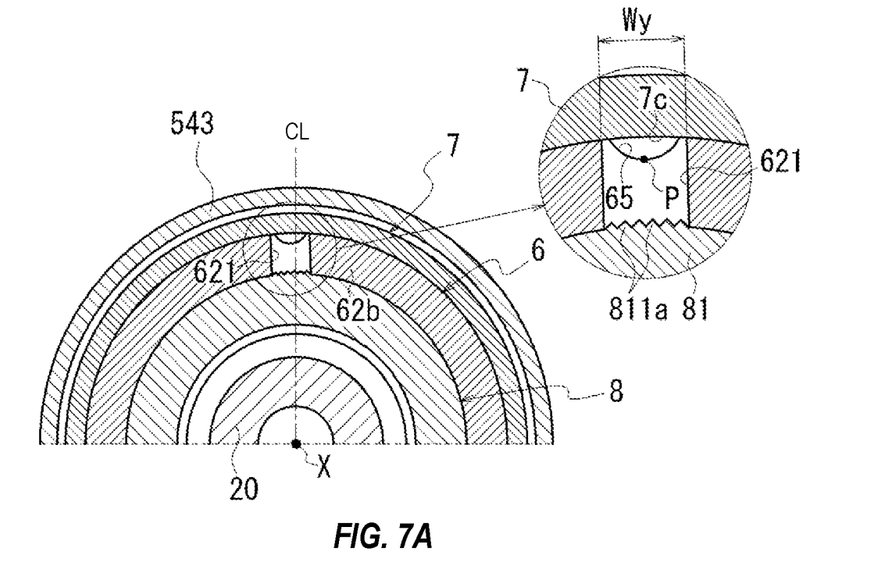
FIG. 7A is a cross-sectional view taken along the line VIIa-VIIa in FIG. 3.
Figure 7B:
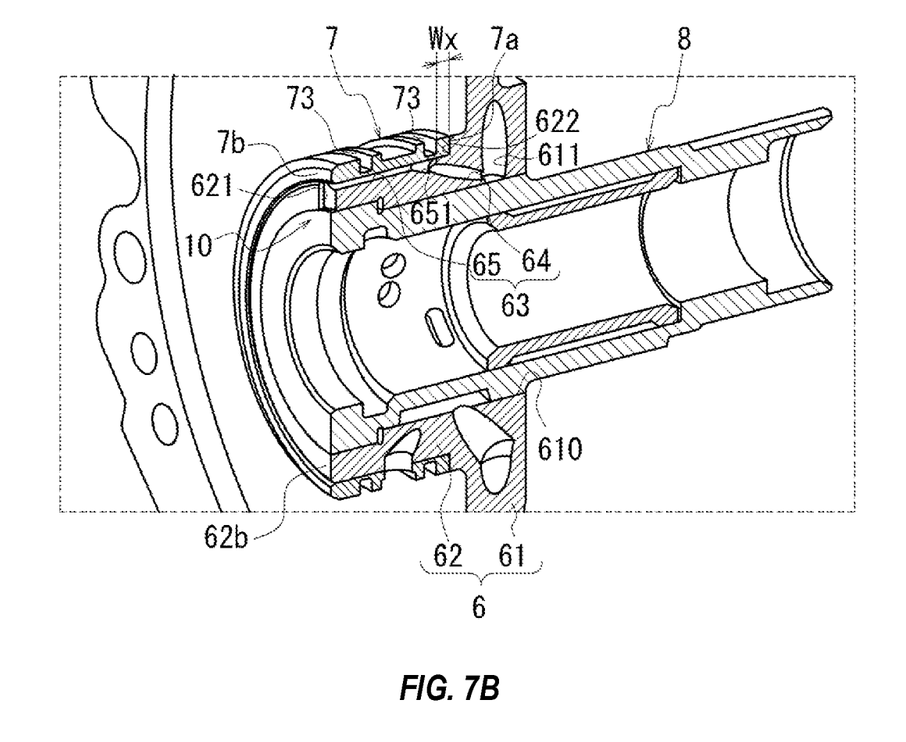
FIG. 7B is a perspective view schematically showing a cross section of a cover member cut along the center line CL in FIG. 7A.

As shown in FIG. 7B, the ring grooves 73 and 73 are provided through the whole periphery in the peripheral direction around the rotation axis X.

As shown in FIG. 5A, the low-friction type seal rings 9 and 9 are externally fitted to the ring grooves 73 and 73.

As shown in FIG. 5B, the seal ring 9 has a base portion 91 on the outer diameter side and a projection portion 92 protruding from the inner periphery of the base portion 91. The projection portion 92 protrudes at a predetermined height h (see FIG. 5C) through the whole periphery in the peripheral direction around the rotation axis X.

The projection portion 92 protrudes from the substantially central portion in the width direction (the direction of the rotation axis X) of the base portion 91 toward the inner diameter side. In cross-sectional view, the seal ring 9 has a substantially T-shape.

The width W1 in the direction of the rotation axis X of the projection portion 92 is narrower than the width W2 in the direction of the rotation axis X of the base portion 91 (see FIG. 5B).

One side surface 92b of the projection portion 92 in the direction of the rotation axis X is at a position offset from the side surface 91b of the base portion 91 toward the other side surface 92c.

The seal ring 9 is loosely fitted in the ring groove 73 and can be displaced in the direction of the rotation axis X (the left-right direction in FIG. 5A) and in the radial direction (the up-down direction in FIG. 5A).

When a hydraulic pressure is supplied to the oil chamber R described above, the oil OL is supplied to the ring groove 73 from the oil groove 72 through the gap between the inner periphery 543a of the inner wall portion 543 of the clutch drum 54 and the outer periphery 7c of the tubular member 7.

The oil OL supplied to the ring groove 73 acts on the inner periphery 91d and side surface 91c of the base portion 91 of the seal ring 9 and the inner periphery 92d and side surface 92c of the projection portion 92 to move the seal ring 9 to the position shown in FIG. 5E.

In this state, the seal ring 9 brings the outer periphery 91a of the base portion 91 into press-contact with the inner periphery 543a of the inner wall portion 543 and brings the side surface 91b into press-contact with the side surface 73b of the ring groove 73 to seal the gap between the inner periphery 543a of the inner wall portion 543 and the outer periphery 7c of the tubular member 7.

Thereby, it is prevented that a part of the oil OL supplied to the oil chamber R leaks from the ring groove 73 through the gap between the inner periphery 543a of the inner wall portion 543 and the outer periphery 7c of the tubular member 7.

Further, when the supply of the oil OL to the oil chamber R is stopped, the oil in the ring groove 73 is also discharged, and the seal ring 9 can be displaced to an open position (see FIGS. 5A-5C) where the seal ring 9 does not seal the gap between the inner periphery 543a of the inner wall portion 543 and the outer periphery 7c of the tubular member 7.

At this time, the outer periphery 91a and side surface 91b of the seal ring 9 may remain held in contact with the inner periphery 543a of the inner wall portion 543 and the side surface 73b of the ring groove 73, respectively.

In this state, when the clutch drum 54 and the support wall portion 62 (tubular member 7) rotate relative to each other, the side surface 91b of the seal ring 9 which is in press-contact with the side surface 73b of the ring groove 73 resists the relative rotation, and may affect the fuel economy of the vehicle mounted with the automatic transmission 1.

In this embodiment, the seal ring 9 having the projection portion 92 having the predetermined height h is adopted, and the area in press-contact with the side surface 73b of the ring groove 73 (the area of the side surface 91b) is made narrower than the seal ring 9' (see FIG. 5F) of the comparative example that does not have the projection portion 92.

In the case of the seal ring 9, comparing with the seal ring 9' (see FIG. 5F) of the comparative example having the same radial height h', the area in contact with the side surface 73b of the ring groove 73 is narrower by the height h of the projection portion 92.

Thus, in the state that the outer periphery 91a and side surface 91b of the seal ring 9 remain in contact with the inner periphery 543a of the inner wall portion 543 and the side surface 73b of the ring groove 73, respectively, even if the clutch drum 54 and the support wall portion 62 (tubular member 7) rotate relative to each other, the resistance (friction) is smaller than in the case of the seal ring 9' of the comparative example.

Further, by providing the projection portion 92 having the predetermined height h, the pressure of the oil OL acting on the side surface 92b of the projection portion 92 acts in a direction of separating the side surface 91b of the seal ring 9 from the side surface 73b of the ring groove 73. Thus, the press-contact force of the side surface 91b of the seal ring 9 with respect to the side surface 73b of the ring groove 73 is reduced as compared with the seal ring 9' of the comparative example.

Thereby, after the inflow of the oil OL into the ring groove 73 is stopped, it becomes difficult for the side surface 91b of the seal ring 9 to remain held in contact with the side surface 73b of the ring groove 73.

This also reduces the resistance (friction) when the clutch drum 54 and the support wall portion 62 (tubular member 7) rotate relative to each other.

As described above, the seal ring 9 slides and displaces in the ring groove 73 in conjunction with the switching of supply/non-supply of the oil OL to the oil chamber R. Further, when the clutch drum 54 and the tubular member 7 rotate relative to each other, the seal ring 9 slides in the ring groove 73.

Therefore, in this embodiment, the tubular member 7, on which the ring groove 73 is formed, is formed separately from the cover member 6 (support wall portion 62) formed of an aluminum-based material, and is formed of an iron-based material that has high wear resistance to the seal ring 9.

Thereby, the ring groove 73 is less likely to wear due to the seal ring 9 which slidingly displaces.

Figure 6A:
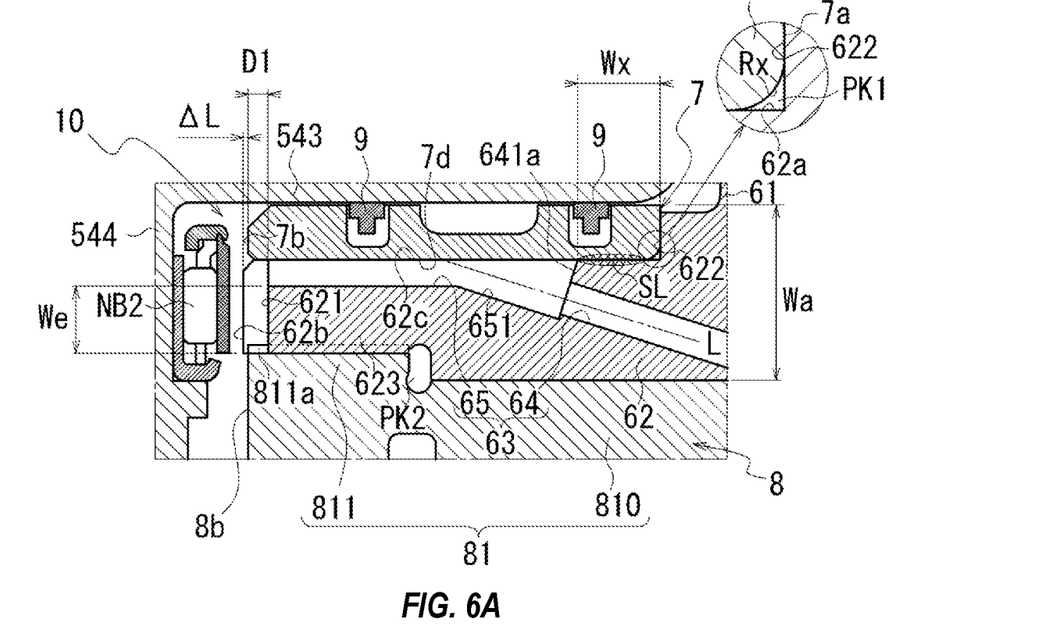
FIG. 6A is an enlarged view of a support wall portion provided with an oil passage.
Figure 6B:
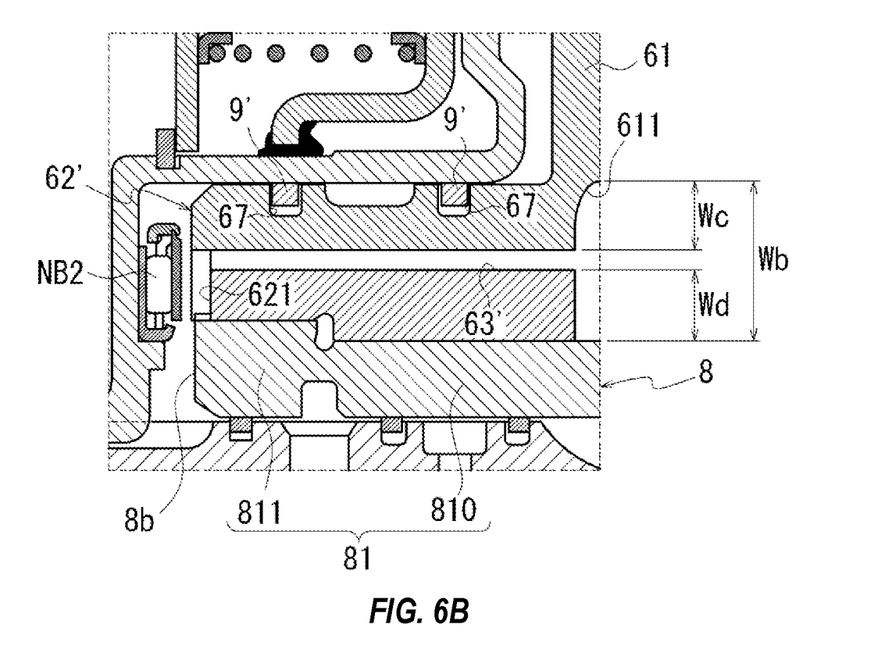
FIG. 6B is a diagram showing a support wall portion according to a comparative example.

FIGS. 6A-6B are diagrams illustrating the superiority of the oil passage structure 10 according to this embodiment.

FIG. 6A is an enlarged view of the support wall portion 62 provided with an oil passage 63. FIG. 6B is a diagram showing a support wall portion 62' according to a comparative example.

FIGS. 7A-7B are diagrams illustrating the oil passage structure 10 according to this embodiment. FIG. 7A is a cross-sectional view taken along the line VIIa-VIIa in FIG. 3. FIG. 7B is a perspective view schematically showing a cross section of the cover member 6 cut along the center line CL in FIG. 7A. Further, FIG. 7B shows a cross section of the support wall portion 62 of the cover member 6 cut at the portion of the oil passage 63.

As shown in FIG. 3, the oil passage 63 is also formed inside the support wall portion 62 as in the partition wall portion 61. The oil passage 63 is provided to supply the oil OL for lubrication to the thrust needle bearing NB2 arranged opposite to a tip end 62b of the support wall portion 62.

The oil passage 63 is configured of an internal oil passage 64 and an oil groove 65 whose opening on the outer periphery side is closed by the tubular member 7.

The internal oil passage 64 extends in the support wall portion 62 in a direction away from the partition wall portion 61 (the left direction in the figure). The internal oil passage 64 is provided along the straight line L inclined with respect to the rotation axis X. The internal oil passage 64 is formed in a direction of approaching the outer periphery of the support wall portion 62 as the distance from the partition wall portion 61 increases.

The end portion on the inner diameter side of the internal oil passage 64 communicates with an oil passage 611 provided in the partition wall portion 61 on the inner diameter side of the partition wall portion 61. In the partition wall portion 61, the oil passage 611 opens on the inner periphery of the insertion hole 610, and the opening of the oil passage 611 is sealed by the outer periphery of the stator shaft 8 press-fitted into the inner periphery of the support wall portion 62.

Thus, the oil OL supplied to the oil passage 611 from the unillustrated hydraulic control circuit flows into the internal oil passage 64 in the support wall portion 62.

The end portion on the outer diameter side of the internal oil passage 64 communicates with the oil groove 65 that opens on the outer periphery of the support wall portion 62.

As shown in FIG. 7A, in the support wall portion 62, the oil groove 65 is provided at one place in the peripheral direction around the rotation axis X. When viewed from the direction of the rotation axis X, the oil groove 65 has a semicircular shape with a vertex P facing the side of the rotation axis X.

As shown in FIG. 6A and FIG. 7B, the oil groove 65 is provided on the outer periphery of the support wall portion 62 in the direction along the rotation axis X. The oil groove 65 extends from the tip end 62b of the partition wall portion 61 toward the partition wall portion 61 (the right side in the figure) in a straight line shape.

As shown in FIG. 6A, the outer periphery of the support wall portion 62 is provided with a step portion 622.

The oil groove 65 is formed from the tip end 62b to a position shifted toward the tip end 62b by a predetermined distance Wx from the step portion 622.

A counterbore portion 651 is provided at the end portion on the side of the partition wall portion 61 (the right side in the figure) in the oil groove 65. The counterbore portion 651 is formed in a direction along the straight line L passing through the center of the aforementioned oil passage 63, extending from the oil groove 65 to the inner diameter side (the side of the rotation axis X).

A bottom surface 641a of the counterbore portion 651 is a flat surface orthogonal to the straight line L, and the internal oil passage 64 formed in a direction orthogonal to the bottom surface 641a opens on the bottom surface 641a of the counterbore portion 651.

At the tip end 62b of the support wall portion 62, a recess portion 621 is formed at a position intersecting the oil groove 65.

As shown in FIG. 7A, the recess portion 621 is formed by cutting out the region on the side of the tip end 62b of the support wall portion 62 in the radial direction. When viewed from the direction of the rotation axis X, the recess portion 621 has a predetermined width Wy, and the oil groove 65 opens inside the recess portion 621.

As shown in FIG. 6A, the recess portion 621 is recessed toward the partition wall portion 61 (the right side in the figure) by a predetermined depth D1 from the other end 7b of the tubular member 7 or the base end 8b of the stator shaft 8.

On the extension of the support wall portion 62, the thrust needle bearing NB2 supported by the clutch drum 54 (circular plate portion 544) is located.

The tip end 62b of the support wall portion 62 protrudes by ΔL toward the thrust needle bearing NB2 from the other end 7b of the tubular member 7 or the base end 8b of the stator shaft 8. Thus, when the clutch drum 54 is displaced in the direction of the rotation axis X, only the support wall portion 62 comes into contact with the thrust needle bearing NB2 which is displaced together with the clutch drum 54.

An end 7a of the tubular member 7 press-fitted onto the outer periphery of the support wall portion 62 is abutted from the direction of the rotation axis X against the step portion 622 of the outer periphery of the support wall portion 62.

In this state, the opening on the outer periphery side of the oil groove 65 is closed by the tubular member 7. Thereby, an oil passage extending along the rotation axis X to the tip end 62b of the support wall portion 62 is formed between the outer periphery 62c of the support wall portion 62 and the inner periphery 7d of the tubular member 7.

As described above, the oil groove 65 is formed up to a position shifted toward the tip end 62b from the partition wall portion 61 (a position offset toward the tip end 62b with respect to the partition wall portion 61). Thus, a sealing region SL, which has the predetermined distance Wx and is not involved in the formation of oil passage is formed between the outer periphery 62c of the support wall portion 62 and the inner periphery 7d of the tubular member 7.

Thereby, it is prevented that the oil OL supplied to the oil groove 65 through the internal oil passage 64 leaks from the gap between the tubular member 7 press-fitted onto the outer periphery 62c of the support wall portion 62 and the step portion 622 on the side of the partition wall portion 61.

In this embodiment, a curved surface processing Rx is applied to the inner periphery on the side of the end 7a of the tubular member 7, and a pocket PK1 is formed on the inner periphery on the side of the end 7a of the tubular member 7.

This pocket PK1 is provided to capture the contaminants generated when the tubular member 7 is press-fitted onto the outer periphery of the support wall portion 62.

When the tubular member 7 is press-fitted onto the outer periphery of the support wall portion 62, the surface of the support wall portion 62 is scraped, generating contaminants. The contaminants generated during the press-fitting process are pushed by the tubular member 7, and move toward the step portion 622.

When the pocket PK1 is not provided, the generated contaminants may get jammed between the end 7a of the tubular member 7 and the step portion 622, forming a gap. In addition, the generated contaminants may form a gap between the inner periphery 7d of the tubular member 7 and the outer periphery 62c of the support wall portion 62. In such a case, the oil OL supplied from the internal oil passage 64 to the oil groove 65 may leak from the side of the partition wall portion 61 through the formed gap.

In this embodiment, the pocket PK1 is formed on the inner periphery on the side of the end 7a of the tubular member 7 to prevent the occurrence of such a situation.

As described above, the fitting portion 81 of the stator shaft 8 is press-fitted into the inner periphery of the support wall portion 62. The fitting portion 81 has a press-fitting portion 810 and a serration fitting portion 811.

The serration fitting portion 811 is formed with an outer diameter larger than a diameter of the press-fitting portion 810. The serration fitting portion 811 is located on the side of the base end 8b (the left side in the figure) when viewed from the press-fitting portion 810.

The outer periphery of the serration fitting portion 811 is serrated.

A serration 811a is formed in a straight line shape in the direction along the rotation axis X, and the outer periphery of the serration fitting portion 811 is provided with the serration 811a through the whole periphery in the peripheral direction around the rotation axis X. In the serration fitting portion 811, the serration 811a is provided through the whole length in the direction of the rotation axis X.

In the support wall portion 62, the inner diameter side of the region where the oil groove 65 is provided is a fitted portion 623 to which the serration fitting portion 811 fits.

In the support wall portion 62, the region on the tip end 62b side (the left side in the figure) of the counterbore portion 651 in the oil groove 65 is the fitted portion 623.

In this embodiment, when the serration fitting portion 811 is serration-fitted to the inner periphery of the support wall portion 62 (fitted portion 623), a pocket PK2 is formed between the serration fitting portion 811 and the press-fitting portion 810.

When the serration fitting portion 811 is serration-fitted to the inner periphery of the support wall portion 62, the surface of the support wall portion 62 (the inner periphery of the fitted portion 623) is scraped, generating contaminants.

The contaminants generated during the serration fitting process are pushed and moved by the serration fitting portion 811.

When the pocket PK2 is not provided, the generated contaminants may form a gap between the inner periphery of the support wall portion 62 (fitted portion 623) and the outer periphery of the fitting portion 81.

In this embodiment, the pocket PK2 in the direction of the rotation axis X is formed between the serration fitting portion 811 and the support wall portion 62 to prevent the occurrence of such a situation.

Here, the inventor of the present invention simply changed the constituent material of the cover member 6 from a conventional iron-based material to an aluminum alloy-based material in order to reduce the weight of the cover member 6, and found that the ring grooves 67 and 67 (see FIG. 6B) provided in the outer periphery of the support wall portion 62' wear.

This is due to the following reason.

The seal ring 9 slides in the ring groove 67 in the process of repeatedly supplying/shutting off the operating hydraulic pressure (oil OL) to the oil chamber R or in the process of relative rotation between the clutch drum 54 and the support wall portion 62. The aluminum alloy-based material has a lower wear resistance to the seal ring 9 made of a fluorine-based material than the iron-based material, and thus, the ring groove 67 is scraped by the sliding seal ring 9.

Here, if the whole oil passage 63' is formed to be embedded inside the support wall portion 62', to ensure the rigidity of the support wall portion 62', it is necessary to increase the amount of the constituent material in the region surrounding the oil passage 63' and increase the radial thicknesses Wc and Wd (see FIG. 6B) of the constituent material surrounding the oil passage 63' among the constituent materials of the support wall portion 62'.

Therefore, in the cover member 6 formed of the aluminum alloy-based material, if the radial thickness Wb of the support wall portion 62' is reduced for the purpose of further weight reduction, since the radial thicknesses Wc and Wd are also reduced, the total amount of the constituent material in the region surrounding the oil passage 63' is reduced.

Thus, the ratio of the constituent material to the support wall portion 62' decreases, and consequently, the support rigidity of the support wall portion 62' decreases. Further, the wear of the ring groove 67 may cause deterioration of the sealing property, etc. of the seal ring 9'.

Therefore, in this embodiment, the tubular member 7 made of the iron-based material having high wear resistance to the seal ring 9 is press-fitted onto the outer periphery of the support wall portion 62 made of the aluminum alloy-based material, and the ring grooves 67 and 67 into which the seal ring 9 loosely fits are formed in the outer periphery of the tubular member 7.

Thereby, the support wall portion 62 made of the aluminum alloy-based material is prevented from being worn by the sliding seal ring 9.

Further, the oil passage structure 10, in which the oil passage 63 along the direction of the rotation axis X is formed between the outer periphery of the support wall portion 62 and the inner periphery of the tubular member 7 press-fitted onto the outer periphery of the support wall portion 62, is adopted, and the oil passage along the rotation axis X is not formed in a state of being completely embedded inside the support wall portion 62.

Thereby, in the support wall portion 62, the rigidity of the support wall portion 62 can be ensured only by ensuring the thickness We (see FIG. 6A) on the inner diameter side of the oil passage 63.

Thus, the radial thickness Wa (see FIG. 6A) of the entire support wall portion 62 including the thickness of the tubular member 7 press-fitted onto the outer periphery of the support wall portion 62 can be thinner than the thickness Wb of the support wall portion 62' (see FIG. 6B) of the comparative example in which the oil passage is embedded inside.

In addition, as described above, the sleeve 211 which rotates integrally with the drive sprocket 27 is externally inserted to the stator shaft 8 supported by the support wall portion 62. Thus, when the oil pump (not illustrated) is driven, stress acts on the stator shaft 8 from the chain wound around the drive sprocket 27 toward the rotation axis X. Then, the stress input to the stator shaft 8 acts on the cover member 6 (support wall portion 62) where the stator shaft 8 is supported.

As described above, in the oil passage structure 10, in which the oil passage 63 along the direction of the rotation axis X is formed between the outer periphery of the support wall portion 62 and the inner periphery of the tubular member 7 press-fitted onto the outer periphery of the support wall portion 62, the radial thickness can be reduced while ensuring the support strength of the support wall portion 62.

Thus, it is possible to cause the support wall portion 62 to have a support strength that can withstand the stress input from the stator shaft 8, more specifically, the stress input from the stator 22 of the torque converter 2 via the stator shaft 8.

As described above, the oil passage structure 10 according to this embodiment has the following configuration.

(1) The oil passage structure 10 includes:
  the support wall portion 62 surrounding the insertion hole 610 of the output shaft 20 (shaft);
  the tubular member 7 (first tubular member) that externally fits on the support wall portion 62; and
  the stator shaft 8 (second tubular member) that internally fits in the support wall portion 62 and supports the outer periphery of the output shaft 20,
  wherein an oil passage 63 along the direction of the rotation axis X of the output shaft 20 is provided between the support wall portion 62 and the tubular member 7 in the radial direction of the rotation axis X (see FIG. 3).

As shown in FIG. 6B, if the whole oil passage 63' is formed to be embedded inside the support wall portion 62', to ensure the rigidity of the support wall portion 62', it is necessary to increase the amount of the constituent material in the region surrounding the oil passage 63' among the constituent materials of the support wall portion 62'.

In such a case, it is necessary to increase both of the radial thicknesses Wc and Wd (see FIG. 6B) of the constituent material surrounding the oil passage 63.

Therefore, when the outer diameter of the support wall portion 62' is reduced for the purpose of weight reduction, the total amount of the constituent material in the region surrounding the oil passage 63' is reduced, and the ratio of the constituent material to the support wall portion 62' decreases, and consequently, the support rigidity of the support wall portion 62' decreases.

When configured as above, the oil passage 63 is formed using the fitting surface of the support wall portion 62 and the tubular member 7.

Thereby, when the outer diameter of the support wall portion 62 is reduced, it is not necessary to increase the thickness of the constituent material surrounding the oil passage 63 on the outer diameter side.

That is, in the support wall portion 62, the rigidity of the support wall portion 62 can be ensured only by ensuring the thickness Wc (see FIG. 6A) on the inner diameter side of the oil passage 63.

Thus, the radial thickness Wa (see FIG. 6A) of the entire support wall portion 62 including the thickness of the tubular member 7 press-fitted onto the outer periphery of the support wall portion 62 can be thinner than the thickness Wb of the support wall portion 62' (see FIG. 6B) of the comparative example in which the oil passage is embedded inside.

The oil passage structure 10 according to this embodiment has the following configuration.

(2) The oil passage 63 has a region formed by closing the opening on the outer periphery side of the oil groove 65 provided on the outer periphery of the support wall portion 62 with the inner periphery 7d of the tubular member 7.

For example, when an oil passage is formed by closing the opening on the outer periphery side of the oil groove 65 provided on the outer periphery of the support wall portion 62 with the inner periphery 7d of the tubular member 7, the amount of constituent material around the oil passage can be increased in the support wall portion 62 with reduced radial thickness than if the oil passage is formed inside the support wall portion 62.

Thereby, the support rigidity of the output shaft 20 (shaft) at the support wall portion 62 can be ensured.

In addition, the oil passage can be formed simply by providing the oil groove 65 on the outer periphery of the support wall portion 62, and thus, the machining load is less than if the oil passage is provided inside the support wall portion 62. Thereby, reduction of the machining cost for forming the oil passage can be expected.

The oil passage structure 10 according to this embodiment has the following configuration.

(3) On the stator shaft 8, the outer periphery of the serration fitting portion 811 on the side of the base end 8b is serrated.

The stator shaft 8 is fixed to the inner periphery of the support wall portion 62 by serration-fitting the serration fitting portion 811 which has been serrated to the inner periphery of the support wall portion 62.

The stress caused by the serration-fitting acts on the region, where the stator shaft 8 is serration-fitted, in the support wall portion 62.

Therefore, if the oil passage 63' (see FIG. 6B) is formed to be embedded inside the support wall portion 62', it is necessary to increase the radial thicknesses Wc and Wd (see FIG. 6B) of the constituent material surrounding the oil passage 63', that is, to increase the radial thickness of the support wall portion 62'. This is to ensure the rigidity that can withstand the serration-fitting while ensuring the support rigidity of the output shaft 20.

Thus, it becomes difficult to reduce the radial thickness (outer diameter) of the support wall portion 62' for the purpose of weight reduction.

When an oil passage is formed by closing the opening of the oil groove 65 provided on the outer periphery of the support wall portion 62 with the inner periphery 7d of the tubular member 7, at least the rigidity of the support wall portion 62 can be ensured even if the outer diameter of the support wall portion 62 is made smaller than that in the case where the whole oil passage 63 is formed to be embedded inside the support wall portion 62.

Thus, it becomes easy to ensure the support rigidity of the output shaft 20 and the rigidity that can withstand the serration-fitting while suppressing the outer diameter of the support wall portion 62.

Therefore, the weight can be reduced while reducing the outer diameter of the support wall portion 62 as compared with the case where the oil passage 63' is formed in the support wall portion 62'.

Further, since the oil passage 63 is provided on the outer periphery side of the support wall portion 62, it is possible to reduce the possibility of mixing the cutting piece, which are generated when the serration fitting portion 811 of the stator shaft 8 is press-fitted into the inner periphery of the support wall portion 62, into the oil passage 63.

The oil passage structure 10 according to this embodiment has the following configuration.

(4) In the support wall portion 62, the partition wall portion 61 (large diameter portion) having the outer diameter larger than the outer diameter of the support wall portion 62 is provided at one end in the direction of the rotation axis X.

Regarding the support wall portion 62, the tubular member 7 is press-fitted onto the outer periphery of the support wall portion 62 from the side of the tip end 62b (the other end) in the direction of the rotation axis X.

The oil passage 63 is formed by closing the opening of the oil groove 65 provided on the outer periphery of the support wall portion 62 with the inner periphery 7d of the tubular member 7.

In the outer periphery of the support wall portion 62, the oil groove 65 extends from the position shifted toward the tip end 62b of the partition wall portion 61 to the tip end 62b.

The oil passage 63 is connected to the oil passage 611 in the partition wall portion 61 on the inner periphery side of the support wall portion 62 via the internal oil passage 64 provided in the support wall portion 62.

When configured in this way, in the outer periphery on the side of the partition wall portion 61 of the support wall portion 62, a region adjacent to the partition wall portion 61 without the oil groove 65 functions as the sealing region SL that seals the gap between the outer periphery 62c of the support wall portion 62 and the inner periphery 7d of the tubular member 7.

When the oil groove 65 of the outer periphery of the support wall portion 62 is formed up to the partition wall portion 61, the ground material produced by the press-fitting of the tubular member 7 may be jammed between the end 7a of the tubular member 7 and the partition wall portion 61 in the direction of the rotation axis X, forming a gap.

In this case, there is no sealing region SL that seals the gap between the outer periphery 62c of the support wall portion 62 and the inner periphery 7d of the tubular member 7, and thus, a part of the oil OL flowing through the oil passage 63 may leak to the outside through the formed gap.

By configuring as above to provide a portion that functions as the sealing region SL between the outer periphery 62c of the support wall portion 62 and the inner periphery 7d of the tubular member 7, it can be appropriately prevented that a part of the oil OL flowing through the oil passage 63 leaks to the outside through the gap formed between the tubular member 7 and the partition wall portion 61 or the support wall portion 62.

The oil passage structure 10 according to this embodiment has the following configuration.

(5) The partition wall portion 61 is the cover member 6 that closes the opening of the transmission case of the automatic transmission.

The output shaft 20 is the output shaft of the torque converter 2.

The stator shaft 8 is the stator shaft of the torque converter 2.

When configured in this way, it is possible to reduce the weight of the automatic transmission of the vehicle while ensuring the support rigidity of the output shaft 20 or stator shaft 8 of the torque converter 2.

By reducing the weight of the automatic transmission, the improvement of the fuel efficiency of vehicles mounted with the automatic transmission can be expected.

The oil passage structure 10 according to this embodiment has the following configuration.

(6) The outer periphery 7c of the tubular member 7 is provided with the ring grooves 73 and 73 into which the seal rings 9 and 9 are loosely fitted.

The tubular member 7 is formed of a material that is more wear resistant to the seal ring 9 than the material that constitutes the support wall portion 62.

When the tubular member 7 does not fit externally on the support wall portion 62 and the ring grooves 73 and 73 are provided directly on the support wall portion 62, in reducing the outer diameter of the support wall portion 62 made of the aluminum alloy-based material, it is necessary to consider the wear of the ring grooves due to the seal ring 9.

When configured as above, in reducing the outer diameter of the support wall portion 62, it is not necessary to consider the wear caused by the seal ring 9. Therefore, the radial thickness Wa (see FIG. 6A) including the tubular member 7 fitted externally on the support wall portion 62 can be smaller than the radial thickness Wb (see FIG. 6B) of the case where the ring groove 67 is directly provided in the support wall portion 62'.

For example, when the tubular member 7 is formed of the iron-based material and the support wall portion 62 is formed of the aluminum alloy-based material that is lighter than the iron-based material but is less wear resistant to the seal ring 9 than the iron-based material, the weight can be reduced while ensuring the support rigidity of the output shaft 20.

Moreover, since the aluminum alloy-based material is easier to process than the iron-based material, it is easy to machine a groove in the outer periphery of the support wall portion.

(7) The clutch drum 54 (inner wall portion 543), which is a rotating body of the forward clutch 5, is inserted externally to the tubular member 7 (first tubular member) made of the iron-based material.

The clutch drum 54 is rotatably supported by the outer periphery 7c of the tubular member 7.

In the outer periphery 7c of the tubular member 7, two ring grooves 73 and 73 are provided at an interval in the direction of the rotation axis X.

The supply passages (oil hole 71, oil groove 72) of the oil OL for driving the forward clutch 5 (friction engagement device) open between the ring grooves 73 and 73 provided at an interval in the direction of the rotation axis X.

The seal ring 9 loosely fitted in the ring groove 73 seals the gap between the outer periphery 7c of the tubular member 7 and the inner periphery 543a of the inner wall portion 543 by the oil supplied from the supply passages.

When configured in this way, the wear of the ring groove 67 can be suppressed as compared with the case where the ring groove 67 is directly provided in the outer periphery of the support wall portion 62 made of the aluminum alloy-based material.

(8) The seal ring 9 is formed integrally of: the annular base portion 91, which is in press-contact with the inner periphery 543a of the inner wall portion 543 of the clutch drum 54 from the radial direction; and the projection portion 92 protruding from the inner periphery of the base portion 91 toward the inner diameter side.

When configured in this way, comparing with the seal ring 9' (see FIG. 5E) of the comparative example having the same radial height h', the area of the seal ring 9 in contact with the side surface 73b of the ring groove 73 is narrower by the height h of the projection portion 92.

Thus, in the state that the outer periphery 91a and side surface 91b of the seal ring 9 remain in contact with the inner periphery 543a of the inner wall portion 543 and the side surface 73b of the ring groove 73, respectively, even if the clutch drum 54 and the support wall portion 62 (tubular member 7) rotate relative to each other, the resistance (friction) is smaller.

Further, by providing the projection portion 92 in the seal ring 9, the radial depth of the ring groove 73 becomes deeper though, since the ring groove 73 is provided in the tubular member 7 that fits externally on the support wall portion 62, at least the rigidity of the support wall portion 62 can be ensured even if the outer diameter of the support wall portion 62 is made smaller than that in the case where the whole oil passage 63 is formed to be embedded inside the support wall portion 62.

(9) In the direction of the rotation axis X, the tip end 62b of the support wall portion 62 faces the thrust needle bearing NB2 supported by the circular plate portion 544 of the clutch drum 54.

The tip end 62b of the support wall portion 62 is located on the thrust needle bearing NB2 side of the other end 7b of the tubular member 7 press-fitted onto the outer periphery of the support wall portion 62 and the base end 8b of the stator shaft 8 press-fitted into the inner periphery of the support wall portion 62.

Once configured in this way, when the clutch drum 54 is displaced in the direction of the rotation axis X, only the support wall portion 62 comes into contact with the thrust needle bearing NB2 which is displaced together with the clutch drum 54.

When the thrust needle bearing NB2 also comes into contact with the other end 7b of the tubular member 7 or the base end 8b of the stator shaft 8, the contact area increases, and consequently, the resistance to the rotation of the clutch drum 54 increases.

The resistance to the rotation of the clutch drum 54 can be suppressed by contacting only the support wall portion 62 with the thrust needle bearing NB2 which is displaced together with the clutch drum 54.

[Modification]

Figure 8A:
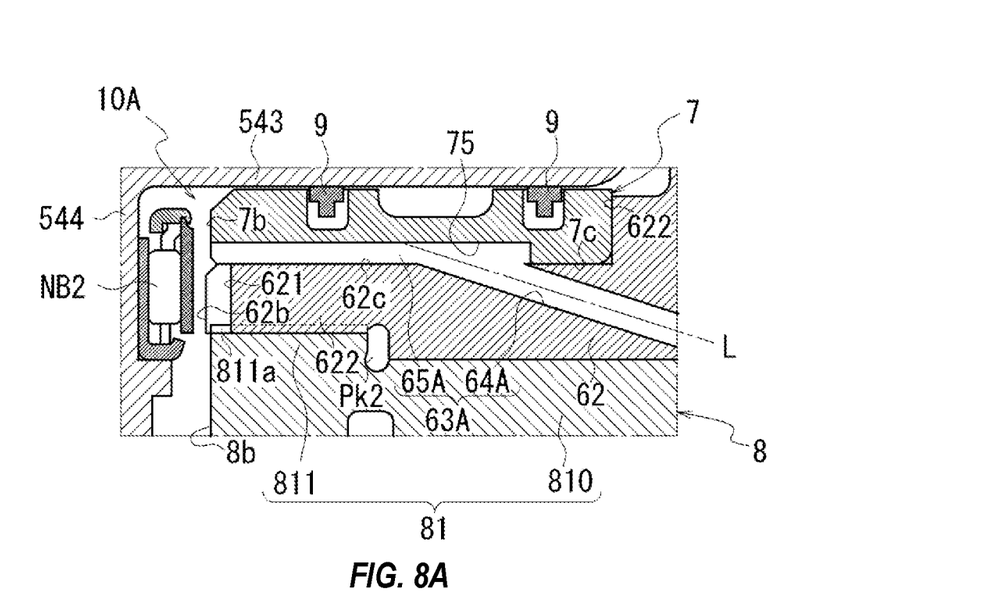
FIG. 8A is a diagram for explaining an oil passage structure according to a modification.
Figure 8B:
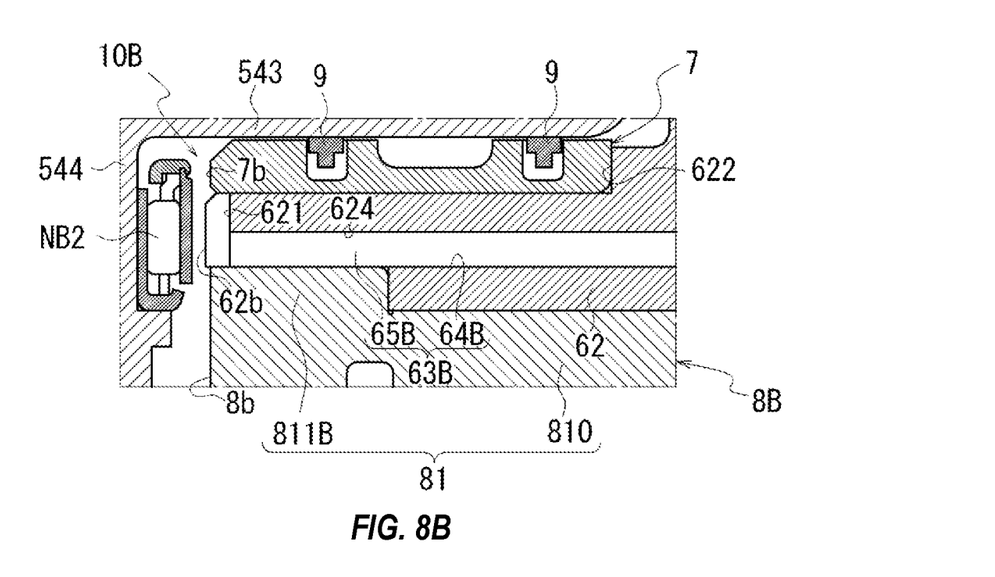
FIG. 8B is a diagram illustrating an oil passage structure according to another modification.

FIGS. 8A-8B are diagrams for explaining the oil passage structures 10A and 10B according to the modification.

The above-described embodiment illustrates the oil passage structure 10 in which the oil passage along the direction of the rotation axis X is formed by closing the oil groove 65 provided on the outer periphery of the support wall portion 62 with the inner periphery of the tubular member 7 press-fitted onto the outer periphery of the support wall portion 62.

As shown in FIG. 8A, it may be an oil passage structure 10A that forms an oil passage 63A along the direction of the rotation axis X by closing the oil groove 75 provided in the inner periphery of the tubular member 7 with the outer periphery 62c of the support wall portion 62.

The oil passage 63A of this oil passage structure 10A is configured of an internal oil passage 64A provided along the straight line L in the support wall portion 62 and an oil passage 65A.

The above-described embodiment illustrates a case where an oil passage is provided between the support wall portion 62 and the tubular member 7 press-fitted onto the outer periphery of the support wall portion 62.

As shown in FIG. 8B, an oil passage 63B may be provided between the support wall portion 62 and a stator shaft 8B press-fitted into the inner periphery of the support wall portion 62.

In this oil passage structure 10B, an internal oil passage 64B along the rotation axis X is provided inside the support wall portion 62, and an oil groove 624 which opens on the inner periphery side is provided on the extension of this internal oil passage 64B.

An oil passage 65B is formed by closing the opening on the inner periphery side of this oil groove 624 with a large diameter portion 811B of the stator shaft 8B press-fitted into the inner periphery of the support wall portion 62.

By doing so, it is possible to ensure the support rigidity of the support wall portion 62 while reducing the radial thickness of the support wall portion 62.

Thus, the oil passage structure 10B according to the modification has the following configuration.

(10) The oil passage 63B has the oil passage 65B formed by closing the opening of the oil groove 624 provided on the inner periphery of the support wall portion 62 with the outer periphery of the stator shaft 8 (second tubular member).

For example, when the oil passage 63B is formed by closing the opening of the oil groove 624 provided on the inner periphery of the support wall portion 62 with the outer periphery of the stator shaft 8, in the support wall portion 62 with a smaller outer diameter, the amount of the constituent material around the oil passage 65B is greater than that in the case where the oil passage is formed inside the support wall portion, and the radial thickness of the support wall portion 62 can be increased, and thus, the support rigidity of the output shaft 20 at the support wall portion 62 can be ensured.

Further, an oil passage may be formed by closing the opening of the oil groove provided on the outer periphery of the stator shaft 8 (second tubular member) with the inner periphery of the support wall portion 62.

In such a case, the outer diameter of the support wall portion can be reduced to the minimum outer diameter that can exhibit the support rigidity required for supporting the output shaft 20 (shaft), and thus, further weight reduction is possible.

Although the embodiments of the present invention have been described above, the invention is not limited only to the aspects shown in these embodiments. It can be modified as needed within the scope of the technical concept of the invention.

The present application claims a priority of Japanese Patent Application No. 2019-226017 filed with the Japan Patent Office on Dec. 14, 2019, all the contents of which are hereby incorporated by reference.

The invention claimed is:

1. An oil passage structure, comprising:
a support wall portion surrounding an insertion hole of a shaft;
a first tubular member configured to externally fit on the support wall portion; and
a second tubular member configured to internally fit in the support wall portion and supports an outer periphery of the shaft,
wherein an oil passage along a rotation axis direction of the shaft is provided at a location between the support wall portion and the first tubular member;
in the support wall portion, a large diameter portion having an outer diameter larger than an outer diameter of the support wall portion is provided at one end in the rotation axis direction;
the first tubular member is press-fitted onto an outer periphery of the support wall portion from the other end in the rotation axis direction and is in contact with the large diameter portion;
the oil passage is formed by closing an opening of a groove provided in the outer periphery of the support wall portion with an inner periphery of the first tubular member;
on the outer periphery of the support wall portion, the groove extends from a position, which is shifted toward the other end from the one end, to the other end; and
the oil passage communicates with another oil passage in the large diameter portion on an inner periphery side of the support wall portion via an internal oil passage provided in the support wall portion.

2. The oil passage structure according to claim 1, wherein the large diameter portion is a cover member that closes an opening of a transmission case of an automatic transmission for a vehicle;
the shaft is an output shaft of a torque converter; and
the second tubular member is a stator shaft of the torque converter.

3. The oil passage structure according to claim 1, wherein the outer periphery of the first tubular member is provided with a ring groove into which a seal ring is loosely fitted; and
the first tubular member is formed of a material that is more wear resistant to the seal ring than the material that constitutes the support wall portion.

4. The oil passage structure according to claim 3, wherein the outer periphery of the second tubular member is serrated, and the second tubular member has the serrated portion press-fitted into the inner periphery of the support wall portion and thus fits into the inner periphery of the support wall portion.

* * * * *